United States Patent Office 2,885,358
Patented May 5, 1959

2,885,358

WATER-IN-OIL EMULSION WELL FLUID AND MATERIALS FOR PREPARING SAME

William A. Reddie, Houston, Tex., assignor to Magnet Cove Barium Corporation, Houston, Tex., a corporation of Arkansas No Drawing. Application September 16, 1954
Serial No. 456,629

1 Claim. (Cl. 252—8.5)

This invention relates to well fluids of the water-in-oil emulsion type which are especially suitable for use in the drilling, completing or workover of wells. In one of its aspects, the invention relates to a dry free-flowing concentrate and a method of using the same, the concentrate being particularly adapted to be added to water and oil to form such water-in-oil emulsion drilling fluids. In another of its aspects, the invention relates to a water-in-oil emulsion well fluid having improved qualities such as increased stability in the presence of added solids and to a method of using such a well fluid.

Recently published developments in the art of water-in-oil emulsion drilling fluids indicate that they will become increasingly popular for drilling into producing formations, workover operations, drilling through salt formations, and in other instances where a very low fluid loss is desired or where it is desired to avoid exposing formations to water in a continuous phase. One such development is set forth in the patent to Lummus, 2,661,334, wherein it is disclosed that an emulsion of water-in-oil can be formed by employing a non-ionic, oil-soluble, surface-active agent as the emulsifier, and stabilizing this emulsion by the addition of a non-ionic, water-soluble, surface-active agent.

From a commercial view point, it would be highly advantageous to possess a dry, free-flowing concentrate which would be employed to formulate a water-in-oil emulsion of the type disclosed in the Lummus patent. Such a concentrate could be prepared at a central manufacturing point under controlled conditions and then shipped to the field for use. Field use would then, of course, entail merely adding the concentrate to the water and oil with suitable mixing to form the desired emulsion, thereby eliminating field measurement of the various ingredients and providing a simple, easy way of compounding the emulsion from a single dry starting material.

A water-in-oil emulsion can be made to invert to an oil-in-water emulsion, and vice versa, by treatment in various manners. For example, one manner of causing a water-in-oil emulsion mud to invert is by the addition of solids, such as bentonite, in an amount sufficient to cause such inversion. This tendency to invert poses a problem of considerable proportion in the use of water-in-oil emulsion muds since in many well operations in which such muds could be used, there will inherently occur a build-up in the clay solid content of the mud. When the solids reach a concentration of certain magnitude, the emulsion mud will invert to an oil-in-water emulsion mud. As a result of this inversion, the mud usually becomes thick and fluffy and the fluid loss increases sharply. Also, the fluid lost is comprised principally of free water as distinguished from the oil or the emulsion, the latter two comprising the principal fluid lost from a water-in-oil emulsion mud. The inverted mud is difficult to handle due to its thick and fluffy character and easily becomes gas-cut which results in a decrease in effective mud weight. It also contaminates the formations which it is desired to protect from water and, since the fluid loss occurs at a high rate, the contamination of the formation with water likewise occurs at a relatively high rate. Accordingly, when a mud inverts, it must be reinverted immediately, removed from the well and scrapped, or temporarily treated with conventional fluid loss reducing agents. This latter procedure is distinctly disadvantageous due to the relatively high cost of an emulsion type mud.

Generally, in those instances where an oil base or a water-in-oil emulsion type mud are to be used, it is desired that the fluid loss be less than 1.0 cc. (30 min.) and in many cases, a 0.0 cc. fluid loss is very desirable.

It is therefore an object of this invention to provide a water-in-oil emulsion well fluid having an improved resistivity to inversion when contaminated with solids and also having a relatively low fluid loss.

Another object of this invention is to prepare a stable water-in-oil emulsion well fluid usually having a very low fluid loss particularly over a broad range of water concentration in the emulsion.

Another object of this invention is to provide a method of drilling, completing or working over a well in which a fluid or mud is circulated comprising a stable water-in-oil emulsion having improved resistivity to inversion through solid contamination and exhibiting improved fluid loss characteristics.

Another object of the invention is to provide a water-in-oil well fluid and a dry, free-flowing concentrate for preparing such fluid, the concentrate and fluid containing lecithin and a preselected preservative therefor which will aid in preventing deterioration of the stabilizing powers of the lecithin even at elevated temperatures or storage of the concentrate for long periods of time.

Another object of this invention is to provide a dry, free-flowing concentrate which will, when properly mixed with oil and water, result in a water-in-oil emulsion fluid having superior properties for drilling, completion and workover operations in wells.

Another object of this invention is to provide such a concentrate which, when mixed with oil and water, provides a water-in-oil emulsion having increased resistivity to inversion by the addition of solids thereto.

Another object of this invention is to provide a dry, free-flowing concentrate in which normally liquid emulsifiers are intermingled with a preselected type or types of adsorptive clay or other minerals present in an amount sufficient to render the mixture dry and free-flowing so that it can be easily handled and shipped and also stored over long periods of time without caking, the mixture at the same time having a superior ability to stabilize and impart improved properties to a water-in-oil emulsion mud for drilling purposes.

Other objects, advantages and features of this invention will be apparent to one skilled in the art upon consideration of the written specification and the appended claim.

Generally, one aspect of the concept of this invention involves the use of selected ones of adsorptive clays or minerals of certain types as carriers or adsorbers for normally liquid surface active agents so as to provide a dry free-flowing mixture or concentrate capable of being bagged and easily used in the field to make up a water-in-oil emulsion mud. Of perhaps equal or even greater importance, the clays of this invention seem to play an important part in determining the characteristics of the resulting emulsion mud. Also, the dry, free-flowing concentrate which is to be used to make up the water-in-oil emulsion mud can have admixed with it certain ingredients other than the clay and surface active agents which ingredients exhibit hygroscopic or deliquescent qualities. In such a concentrate, the clay also acts to prevent such hygroscopic ingredients from becoming gummy and the mixture from caking so that the concentrate remains dry and free-flowing.

As another aspect of this invention and particularly one which finds one practical application in conjunction with the adsorptive clay mentioned above, is that it has been found that certain water-soluble heavy metal salts in which the cation has a valence of three or higher can be incorporated in a water-in-oil emulsion mud to greatly improve the resistivity of the mud to inversion when contaminated by solids such as clays. In many instances, such salts also improve other properties, such as fluid loss, of the emulsion mud. In one preferred embodiment, the metals of these salts are certain of the ones which exhibit amphoterism, such as zirconium and tin. More particularly and in a more favored embodiment, it has been found that by incorporating in a water-in-oil emulsion mud two compounds which are capable of reacting in the mud or one phase thereof to produce aluminum chloride, the resistivity of the mud to inversion due to clay solid contamination is greatly enhanced as compared to the use of either of such compounds separately.

Insofar as the dry, free-flowing concentrate of this invention is concerned, it is possible to set forth two preferred formulae, the second of which also includes the heavy metal salt mentioned above. The first formula is:

FORMULA NO. 1

| Ingredient: | Parts by weight |
|---|---|
| Adsorptive clay (XACT-811) | 16.0 |
| Sodium chloride | 7.0 |
| Sterox CD[1] | 1.5 |
| Commercial lecithin | 4.0 |
| Calcium chloride | 15.0 |
| Total | 43.5 |

[1] Polyoxyethylene ester.

A second and more preferred formula is:

FORMULA NO. 2

| Ingredient: | Parts by weight |
|---|---|
| Adsorptive clay (XACT-811) | 16.0 |
| Sodium chloride | 7.0 |
| Alum (aluminum sulfate) | 7.8 |
| Barium chloride | 9.6 |
| Sterox CD[1] | 1.5 |
| Commercial lecithin | 4.0 |
| Total | 45.9 |

[1] Polyoxyethylene ester.

The ingredients in the above formulae are on an anhydrous basis except that the alum has been weighed as $Al_2(SO_4)_3 \cdot 14H_2O$ and the barium chloride as $$BaCl_2 \cdot 2H_2O$$

which are chemically equivalent to 3.5 parts of $AlCl_3$, assuming complete reaction between the alum and barium chloride. Also the figures in the right-hand columns can be considered as pounds of the respective ingredients per barrel (42 gallons) of combined volume of the oil and water when a predetermined amount of each formula equal to the sum of the ingredients (43.5 and 45.9, respectively) is added to each such barrel of combined water and oil. Since it is more convenient and meaningful to speak in terms of pounds per barrel of the ingredients, such practice will be adhered to in this specification and claim.

While the ingredients of the above two formulas can be combined in a number of different manners, one preferred procedure is to heat the commercial lecithin and Sterox CD to increase their fluidity (e.g. to approximately 150° F.) while mixing them together. They can then be added to the clay and intimately admixed therewith. Then the salts and any other dry ingredient, as indicated in either of the above formulas, can be added to the clay-surface active agent mixture. An alternate preferred mode of admixing is to heat the lecithin separately (e.g. to about 150° F.), add it to the clay with intimate admixing, heat the Sterox CD and add it separately to the clay-lecithin mixture. The salts can then be added to the thus treated clay. Laboratory tests indicate very little difference between the two modes of mixing. In any event, there results a dry, free-flowing concentrate which can be easily bagged and, upon shipping to the field, readily mixed with oil and water to form the desired water-in-oil emulsion. Also, the concentrate of Formula No. 2 remains dry and free-flowing even if stored for considerable periods of time (e.g. 3 months) even at elevated temperatures and this is true to a lesser extent for Formula No. 1 which contains calcium chloride, the latter formula tending to cake somewhat and change in color when stored for a few weeks, particularly at an elevated temperature such as 110° F.

A preservative is preferably added to prevent deterioration of the emulsion-imparting properties of the lecithin which, though heretofore considered to be quite stable, has been found to lose its effectiveness if the dry concentrate containing the same is stored for any appreciable period of time, particularly at elevated atmospheric temperatures such as are found in warehouses along the Gulf Coast and elsewhere. The preservative can likewise be added to the clay along with, before, or after, either or both of the Sterox CD and the lecithin. Preferably, the preservative is added first to the lecithin and the Sterox CD added to the resulting mixture. This mixture of liquid ingredients can be added to the clay. The preservative is preferably oil soluble and suitable ones for Formula No. 2 or other concentrates or emulsions containing a heavy metal salt are Dowcide No. 1 (o-phenylphenol) and Dowcide No. 6 (2,3,4,6-tetrachlorophenol) or admixtures thereof. Other bactericides and anti-oxidants have been tried but found to be ineffective so that bactericides or anti-oxidants as a class cannot be expected to be operable. Usually an effective amount of preservative amounting to at least 0.05 weight percent of the emulsion will be satisfactory.

In preparing the water-in-oil emulsion mud at the drilling site, there are several manners in which the dry, free-flowing concentrate can be combined with the water and oil ingredients. The most preferred is to add the concentrate to the oil and then emulsify the resulting mixture with the water. This has been found to always result in the desired water-in-oil type emulsion. On the other hand, it has been found that where the concentrate is added first to the water, particularly to fresh water, and then the oil brought in, there may sometimes result an oil-in-water type emulsion which not only would expose the formations of the well to a continuous water phase but which also exhibits a very high fluid loss and usually is fluffy and of low density. The tendency to form an oil-in-water type emulsion upon adding the concentrate first to the water and then bringing in the oil is less pronounced when salt water is employed as the aqueous medium. Further when crude oils are employed as the oil phase, as distinguished from refined oil such as diesel oil, the mode of admixing the concentrate with the oil and water seems to be less important. In any instance where it is desired to first mix the concentrate with the water and then bring in the oil, such as where the mud pits or tanks already have water in them and it is not desired to pump it out and replace with oil, a preliminary routine test can be made to determine whether such mode of mixing will result in a desired type of emulsion. If it does not, then the concentrate should be added first to the oil and then the water brought in last. In view of this, it is a generally preferred procedure to first mix the concentrate with the oil and then bring in the water because it invariably results in the desired water-in-oil type emulsion.

Although specific materials and concentrations are named in the above two formulae, it has been found that some latitude is possible with respect thereto. Further, as will be discussed in more detail below, the concept of employing heavy metal salts wherein the cations have a valency of three or higher is applicable not only to the dry, free-flowing concentrate but also to water-in-oil emulsion muds generally, even those made up in the field by adding the ingredients separately thereto.

Clay ingredient

Turning first to a discussion of the adsorptive clay and the role it plays in preparing and using the dry, free-flowing concentrate, it has been found that generally the clay should have sufficient adsorptive powers to permit, with reasonable minimum concentrations of clay, adsorption on the clay of the liquid surface active agents and any other liquid ingredients as well as moisture collecting in the concentrate from the atmosphere. The extent of adsorption should be such that the resulting concentrate is dry and is not gummy or lumpy. As will be discussed in greater detail below, certain clays (e.g. attapulgite) will form a satisfactory concentrate insofar as its dry and free-flowing qualities are concerned and yet the concentrate is not satisfactory from the standpoint of the properties of an emulsion mud containing the same; contrariwise, Attasorb (a treated attapulgite) is satisfactory in Formula No. 2 both to form a dry free-flowing mix and a satisfactory emulsion. On the other hand, other solids (e.g. ground limestone or oyster shell) do not form a dry, free-flowing concentrate but one which is sticky or lumpy and yet the concentrate, though sticky or lumpy, forms a satisfactory emulsion mud. Some minerals (e.g. barytes) seem to form a concentrate having satisfactory dryness and flowing properties with one set of ingredients but not another, the concentrate in either case forming a satisfactory emulsion mud. Further, some clays, such as bentonite, may be satisfactory in forming both the concentrate and the emulsion mud but have a greater tendency than other clays, such as filter clay, to cause the emulsion to invert from a water-in-oil to an oil-in-water emulsion. Hence, they are less preferred. Still further, some clays have greater adsorptive powers than others and hence need be present in lesser concentration to afford a dry, free-flowing concentrate. Generally, the operable clays or minerals are those which have sufficient adsorptive powers to yield a dry, free-flowing concentrate when a reasonable amount of the clay or mineral is employed (at least 10 pounds per barrel and preferably from 10 to 25 pounds of clay per barrel of emulsion when a predetermined weight of concentrate containing at least 10 pounds of the clay is added to the emulsion) and which clay or mineral results in a concentrate capable of imparting satisfactory mud properties to the water-in-oil emulsion mud. In any event, the evaluation of each individual clay with any given group of other ingredients is a matter of mere routine test to one skilled in the art once the concept of this invention is known.

One clay which has been found to be particularly suitable presently bears the trademark XACT–811 and is Angelina County filter clay. It is found in pits in Angelina County, Texas, such as those approximately eight miles south of Zavalla, Texas, and then one and one-half miles west of U.S. Highway 69. Such pits are on the G. W. Norton estate and the J. C. Everet survey and they are so identified on the official survey plats. Such clay has been analyzed to have the following properties:

Chemical analysis

Percentage by weight

| | |
|---|---|
| Silica ($SiO_2$) | 65.63 |
| Aluminum oxide ($Al_2O_3$) | 29.23 |
| Ferric oxide ($Fe_2O_3$) | 1.37 |
| Ferrous oxide (FeO) | 0.42 |
| Calcium oxide (CaO) | 0.10 |
| Magnesium oxide (MgO) | 0.69 |
| Sodium oxide ($Na_2O$) | 0.46 |
| Potassium oxide ($K_2O$) | 0.28 |
| Phosphorous pentoxide ($P_2O_5$) | Absent |

Physical Analysis

| | |
|---|---|
| Color | Light cream. |
| Moisture | Below 5.0%. |
| pH (10 g. in 100 cc. of distilled water) | 3.0–5.0. |
| Average particle size (surface mean diameter by air permeation) | 1–2 microns. |
| Particle size (dry screen test) | 93% through 325 mesh. |
| Bulk density (fluffed) | 37.0 lbs. per cu. ft. |
| Bulk density (compacted) | 50.0 lbs. |

This clay is characterized by a very low yield (substantially non-hydratable) and has considerable adsorptive power. It has been found to result in a dry, free-flowing concentrate with a minimum amount of the clay present (at least 2.9 parts by weight of clay per part by weight of the total of the liquid emulsifiers and any other liquids). Further, the resulting concentrate, when mixed with the oil and water, produces a water-in-oil emulsion mud usually having a fluid loss of substantially zero and certainly less than 1.0 cc. (30 minutes).

Another clay which has been found to be satisfactory, though to a lesser extent than Angelina County filter clay, is an adsorptive clay comprising predominantly calcium montmorillonite (sold under the trademark XACT) and found, for example, in Angelina County, Texas, on the W. C. Stanley survey approximately seven miles due south of Zavalla, Texas. It is classed as a drilling fluid clay and one having a higher yield and lower adsorptive power than Angelina County filter clay. Bentonite is also operable to produce a dry free-flowing concentrate but, being highly hydratable, is not as preferred because it tends to lessen the stability of the emulsion. Other clays which have been found to be satisfactory in many instances are those sold under the name Baroco and under the trademark Hi-Yield. Each of these clays is a relatively low yield clay, such as calcium montmorillonite, which has by suitable treatment been upgraded to increase its yield.

Also found to be quite satisfactory is a clay sold under the name "Attasorb." This clay is an ultra fine (90–95% by weight finer than 10 microns), sorptive, calcined attapulgite (a fuller's earth) described chemically as a complex hydrated magnesium aluminum silicate having an approximate chemical analysis (volatile free basis) as follows:

| | Percent |
|---|---|
| $SiO_2$ | 67.0 |
| $Al_2O_3$ | 12.5 |
| MgO | 11.0 |
| $Fe_2O_3$ | 4.0 |
| CaO | 2.5 |
| Other | 3.0 |

It has a pH within the range of 7.5–8.5 and an oil absorption index of 125–130 by the ASTM rub out method.

Not all types of clays or solids will yield a free-flowing concentrate or one which has satisfactory properties for admixing with oil and water to form water-in-oil emulsions. For example, it has been found that ground oyster shell or limestone produces a putty-like mixture and that attapulgite causes an oil-in-water emulsion to be formed. Generally it is preferred to select a clay from the group consisting of a clay of the type of Angelina County filter clay, kaolin, diatomaceous earth, calcined attapulgite and admixtures thereof. The effect of various mineral and clay solids is reflected in the data set forth in the following tables and from these, it will be seen that other ones of several clays or minerals, not specifically mentioned above, will be satisfactory:

TABLE I

| Test No. | Clay Type | Lbs./bbl. | Total liquid emulsifiers, lbs./bbl. | CaCl$_2$, lbs./bbl. | Ratio clay to emulsifiers | Nature of concentrate |
|---|---|---|---|---|---|---|
| 1 | Ground oyster shell | 16 | 5.5 | 15 | 2.9 | Putty-like. |
| 2 | ___do___ | 16 | 5.5 | None | 2.9 | Do. |
| 3 | Bleaching clay | 16 | 5.5 | 15 | 2.9 | D. and F.F.[1] |
| 4 | ___do___ | 16 | 5.5 | None | 2.9 | D. and F.F. |
| 5 | Baroco | 16 | 5.5 | 15 | 2.9 | Lumpy and sticky. |
| 6 | ___do___ | 16 | 5.5 | None | 2.9 | D. and F.F. |
| 7 | Barytes | 16 | 5.5 | 15 | 2.9 | Lumpy and sticky. |
| 8 | ___do___ | 16 | 5.5 | None | 2.9 | D. and F.F. |
| 9 | Bentonite | 16 | 5.5 | 15 | 2.9 | D. and F.F. |
| 10 | ___do___ | 16 | 5.5 | None | 2.9 | D. and F.F. |
| 11 | XACT | 16 | 5.5 | 15 | 2.9 | D. and F.F. |
| 12 | XACT | 16 | 5.5 | None | 2.9 | Slightly gummy. |
| 13 | XACT-811 | 16 | 5.5 | 15 | 2.9 | D. and F.F. |
| 14 | XACT-811 | 16 | 5.5 | None | 2.9 | D. and F.F. |
| 15 | Attapulgite | 16 | 5.5 | 15 | 2.9 | D. and F.F. |
| 16 | ___do___ | 16 | 5.5 | None | 2.9 | D. and F.F. |
| 17 | XACT-811 | 20 | 10 | None | 2.0 | Putty-like. |
| 18 | XACT-811 | 40 | 10 | None | 4.0 | D. and F.F. |
| 19 | Ground oyster shell | 20 | 9 | 6 | 2.2 | Caked. |
| 20 | ___do___ | 20 | 9 | None | 2.2 | Caked worse than Test 17. |
| 21 | XACT-811 | 30 | 7 | 15 | 4.3 | D. and F.F. |
| 22 | Attasorb | 16 | 5.5 | None | 2.9 | D. and F.F. |
| 23 | ___do___ | 16 | 5.5 | 15 | 2.9 | D. and F.F. |
| 24 | Volcanic ash | 16 | 5.5 | None | 2.9 | Lumpy and sticky. |
| 25 | ___do___ | 16 | 5.5 | 15 | 2.9 | Do. |
| 26 | Diatomaceous earth | 16 | 5.5 | None | 2.9 | D. and F.F. |
| 27 | ___do___ | 16 | 5.5 | 15 | 2.9 | D. and F.F. |
| 29 | Kaolin | 16 | 5.5 | None | 2.9 | Sticky and lumpy. |
| 30 | ___do___ | 16 | 5.5 | 15 | 2.9 | D. and F.F. |
| 31 | Bennett and Clark Activite. | 16 | 5.5 | None | 2.9 | D. and F.F. |
| 32 | ___do___ | 16 | 5.5 | 15 | 2.9 | D. and F.F. |
| 33 | Filtrol grade A | 16 | 5.5 | None | 2.9 | D. and F.F. |
| 34 | ___do___ | 16 | 5.5 | 15 | 2.9 | D. and F.F. |

[1] Dry and free-flowing.

TABLE II

| Test No. | Clay Type | Lbs./bbl. | Mode of compounding | Emulsion mud [4] Ingredients Lecithin | Sterox | CaCl$_2$ | Viscosity, centipoises | Gel. strengths, gms. initial/10 min. | Fluid loss, cc./30 min. |
|---|---|---|---|---|---|---|---|---|---|
| 1A | Ground oyster shell | 16 | Conc.[1] | Formula No. 1 | | | 56 | 0/0 | 0.7 emulsion. |
| 2A | ___do___ | 16 | Conc | Formula No. 2 | | | 69 | 0/0 | 0.0. |
| 3A | Bleaching clay | 16 | Conc | Formula No. 1 | | | 49 | 0/0 | 1.2 emulsion. |
| 4A | ___do___ | 16 | Conc | Formula No. 2 | | | 57 | 0/0 | 0.0. |
| 5A | Baroco | 16 | Conc | Formula No. 1 | | | 56 | 0/0 | 0.0. |
| 6A | ___do___ | 16 | Conc | Formula No. 2 | | | 68 | 0/0 | 0.0. |
| 7A | Barytes | 16 | Conc | Formula No. 1 | | | 53 | 0/0 | 1.5 emulsion. |
| 8A | ___do___ | 16 | Conc | Formula No. 2 | | | 62 | 0/0 | 0.3 emulsion. |
| 9A | Bentonite | 16 | Conc | Formula No. 1 | | | 57 | 0/0 | 1.0 emulsion. |
| 10A | ___do___ | 16 | Conc | Formula No. 2 | | | 74 | 0/0 | 0.0. |
| 11A | XACT | 16 | Conc | Formula No. 1 | | | 50 | 0/0 | 1.0 emulsion. |
| 12A | XACT | 16 | Conc | Formula No. 2 | | | 62 | 0/0 | 0.0. |
| 13A | XACT-811 | 16 | Conc | Formula No. 1 | | | 47 | 0/0 | 0.4 emulsion. |
| 14A | XACT-811 | 16 | Conc | Formula No. 2 | | | 54 | 0/0 | 0.0. |
| 15A | Attapulgite | 16 | Conc | Formula No. 1 | | | O./w. emulsion, light and fluffy. | | 33 (5. oil). |
| 16A | ___do___ | 16 | Conc | ___do___ | | | | | 34 (5. oil). |
| 18A | XACT-811 | 40 | (2) | 8 | 2 | 0 | 90 | 1/1 | 0.0. |
| 22A | Attasorb | 16 | Conc | Formula No. 2 | | | 72 | 0/0 | 0.5 oil. |
| 23A | ___do___ | 16 | Conc | Formula No. 1 | | | 51 | 0/0 | 5.0 (1.8 oil). |
| 24A | Volcanic ash | 16 | Conc | Formula No. 2 | | | 60 | 0/0 | 1.7 emulsion. |
| 25A | ___do___ | 16 | Conc | Formula No. 1 | | | 51 | 0/0 | 5.2 emulsion. |
| 26A | Diatomaceous earth | 16 | Conc | Formula No. 2 | | | 61 | 0/0 | 0.0. |
| 27A | ___do___ | 16 | Conc | Formula No. 1 | | | 52 | 0/0 | 2.9 (1.5 oil). |
| 29A | Kaolin | 16 | Conc | Formula No. 2 | | | 60 | 0/0 | 0.0. |
| 30A | ___do___ | 16 | Conc | Formula No. 1 | | | 58 | 0/0 | 0.0. |
| 31A | Bennett and Clark Activite. | 16 | Conc | Formula No. 2 | | | 58 | 0/0 | 0.0. |
| 32A | ___do___ | 16 | Conc | Formula No. 1 | | | 64 | 0/0 | 0.4 emulsion. |
| 33A | Filtrol Grade A | 16 | Conc | Formula No. 2 | | | 58 | 0/0 | 0.0. |
| 34A | ___do___ | 16 | Conc | Formula No. 1 | | | 56 | 0/0 | 0.5 oil. |
| 35 | Ground oyster shell | 16 | Wet [3] | 8 | 1 | 0 | 65 | 0/0 | 1.8 (0.7 emulsion, 1.1 oil). |
| 36 | XACT-811 | 16 | Wet | 8 | 1 | 0 | 81 | | 0.6 oil. |
| 37 | Attapulgite | 20 | Wet | 8 | 1 | 0 | O./w. emulsion, light and fluffy. | | 36 (35 water, 1 oil). |
| 38 | XACT | 20 | Wet | 8 | 1 | 0 | 72 | 2/2 | 0.4. |
| 39 | Bentonite | 88 | (2) | 16 | 2 | 0 | 202 | | 7.7 (6.3 oil, 1.4 water). |
| 40 | East Texas Red | 30 | (2) | 6 | 2 | 15 | 62 | 2/2 | 8.3 (1.3 oil, 7.0 water). |

[1] Conc. means a dry concentrate was first prepared according to Formula No. 1 or No. 2 as specified in the column headed "Ingredients."
[2] Concentrate formed by adding indicated amounts of only lecithin and Sterox CD to the clay (no salts were used other than CaCl$_2$ as indicated in table).
[3] Wet means that lecithin was first added to the oil, then the resulting mixture emulsified with water, followed by addition of the clay and then the Sterox CD.
[4] 40 vol. percent diesel oil and 60 vol. percent water were used throughout.

It will be noted from the above tables that the effect of the solids or clays vary one from the other and that actually, according to standard drilling mud practices, routine tests should be conducted whenever a formula or ingredient is varied to determine the effect of the selected mineral or clay.

Surface active agents

While specific surface active agents have been referred to above, it will be realized that others can be employed. In general, the surface active agents disclosed in the above-identified Lummus patent are operable. The quantity of each of these surface active agents can also be within the ranges set forth in such patent and hence, the disclosure of said patent with respect to these two ingredients is incorporated herein by reference. Thus, for example, the oil-soluble, non-ionic, surface active agent can comprise esters of polyhydric alcohols so long as they are oil-soluble, relatively non-ionic and contain at least one, and preferably two water-soluble groups, such as hydroxyl groups to cause concentration of the material at the oil-water interfaces. Lecithin is the preferred example of the oil-soluble emulsifiers because of its relative cheapness and the advantages set forth in the Lummus patent. At least 2.5 pounds of the oil-soluble surface active agent or emulsifier should be employed per barrel of water and oil emulsion. It will be understood that where the term "lecithin" is employed herein, it refers usually to commercial lecithin. Commercial lecithin actually contains approximately equal portions of lecithin and cephalin and soy bean oil, the latter serving as a solvent for the lecithin and cephalin. It will be appreciated that the pure compounds (e.g. lecithin) as well as the commercial grades thereof can be employed in carrying out this invention and that the reference to commercial lecithin is merely predicated on the fact that it is readily available in the above-described form.

The water-soluble emulsifier can be any non-ionic, water-soluble, surface active agent (e.g. Sterox CD). At least 0.1 pound of such agent should be employed per barrel of water and oil emulsion.

Effect of salts

Turning now to another aspect of this invention, it has been found that salts play an important role in water-in-oil emulsion drilling muds. Thus, it has been found that salts, such as the chlorides, bromides, fluorides, sulfates, nitrates, etc., of heavy metals in which the metals exhibit a valency of three or higher (herein generally designated as "heavy metal salts" to distinguish from any sodium chloride, calcium chloride or the like which may also be present), and particularly where such metals have amphoteric properties, will markedly increase the stability of a water-in-oil emulsion mud against inversion to an oil-in-water emulsion upon contamination with solids such as bentonite or clays normally encountered in drilling or servicing a well. Preferred salts of this group comprise the water-soluble inorganic salts of heavy metals in which salts the metals exhibit a valence of three or higher, these metals being selected from the group consisting of zirconium, tin, titanium, molybdenum, iron, vanadium and cobalt and the salts of aluminum which can be formed in situ, and most preferably from the group consisting of zirconium, tin and the water-soluble inorganic salts of aluminum which can be formed in situ. Thus, in a much preferred form, as exemplified by Formula No. 2 above, aluminum sulfate and barium chloride are employed as the ingredients of the concentrate so that they will react in situ when the concentrate is made up with the oil and water, to form aluminum chloride, the resulting barium sulfate being substantially insoluble and appearing as a precipitant. Such a formation of aluminum chloride in situ (Formula No. 2) has resulted in emulsions having superior properties when compared to those formed with either aluminum chloride added as such or with barium chloride alone or aluminum sulfate alone. Further, Formula No. 2 is considerably superior to Formula No. 1 with respect to fluid loss, stability against inversion and lack of deterioration during storage, especially at elevated temperatures.

While the use of the aluminum sulfate and barium chloride as the reactants to form aluminum chloride in situ has been specifically referred to herein, it will be appreciated that other reactants which are capable of forming a water-soluble aluminum salt in situ can be employed and that selection of other reactants can be accomplished by an exercise of the skill of the art once this disclosure is read and understood. Further, the other salts, such as those of zirconium and tin can be prepared in situ in the same manner as the aluminum salt (e.g. chloride) to achieve superior results. Further, while the specific use of the aluminum sulfate and barium chloride reactants has been described with respect to their being constituents of a dry, free-flowing concentrate, they can be added to an emulsion when it is made up in the manner described in the aforesaid Lummus patent. For example, the oil-soluble emulsifier can be first dissolved in the oil. The resulting oil can then be emulsified with the desired volume of water in which the salt (both sodium chloride, if any, and the aluminum sulfate and barium chloride) have been dissolved. The water-soluble emulsifier can then be added to stabilize the emulsion. Thus, the heavy metal salts can be added separately at any stage in the preparation of the emulsion, it being important only that the aluminum sulfate-barium chloride ingredients be present in the final emulsion.

Following is a table setting forth data illustrating the superior characteristics of the emulsion muds of this invention. In considering these data, it must be remembered that a satisfactory emulsion mud should have not only as much resistance to inversion due to the presence of solids, such as bentonite, but also a satisfactory fluid loss characteristic. In general, it is considered highly desirable to provide an emulsion mud which has a fluid loss of 1.0 cc. or less at all times and, in fact, a loss of 0.0 cc. is very desirable. Also, the character of the filtrate is of some importance since an oil or a stable water-in-oil emulsion filtrate are generally preferred to one having a free water phase.

TABLE III

| Salt | | Clay, lbs./bbl. | Emulsion | | | | | Method conc. |
|---|---|---|---|---|---|---|---|---|
| Type | Lbs./bbl. | | Type | Viscosity | Gels, initial, 10 min. | Fluid loss | Order mix | |
| PbCl₂ | 15 | Bl | W./o | 50 | 0/0 | 0.6 E | D.-d.w | No. 2 |
| | | 10 B | W./o | 81 | 0/0 | 2.9 E | | |
| | | 20 B | O./w | | | 47 (7.5) | | |
| | | 10 X | W./o | 54 | 0/0 | 1.2 E | D.-d.w | No. 2 |
| | | 20 X | W./o | 80 | 0/0 | 0.8 E | | |
| | | 30 X | O./w | | | 58 (6.5) | | |
| Ca(CHO₂)₂ | 3.5 | Bl | W./o | 66 | 0/0 | 0.0 | D.w.-d | No. 1 |
| | | 10 B | W./o | 81 | 0/0 | 2.6 (1.6) | | |
| | | 20 B | O./w | | | 39 (4.5) | | |

TABLE III—Continued

| Salt | | Clay, lbs./bbl. | Emulsion | | | | | Method conc. |
|---|---|---|---|---|---|---|---|---|
| Type | Lbs./bbl. | | Type | Viscosity | Gels, initial, 10 min. | Fluid loss | Order mix | |
| CaCl₂ | 3.5 | Bl | W./o. | 53 | 0/0 | 0.3 E | D.-d.w. | No. 1. |
| | | 10 B | W./o. | 67 | 0/0 | 2.4 (1.8 E) | | |
| | | 20 B | O./w. | | | 43.5 (5.5) | | |
| | | 10 X | W./o. | 60 | 0/0 | 0.7 E | | |
| | | 20 X | O./w. | | | 57 (7.0) | | |
| CaSO₄ | 3.5 | Bl | W./o. | 56 | 0/0 | 0.5 E | D.w.-d. | No. 1. |
| | | 10 B | W./o. | 66 | 0/0 | 1.4 (1.0) | | |
| | | 20 B | O./w. | | | 34 (5.0) | | |
| CrCl₃ | 3.5 | Bl | W./o. | 28 | 0/0 | 0.2 E | D.-d.w. | No. 1. |
| | | 10 B | W./o. | 32 | 4/4 | 1.8 oil | | |
| | | 20 B | O./w. | | | 41 (4.5) | | |
| CrCl₃ | 3.5 | Bl | W./o. | 49 | 0/0 | 0.9 E | D.-s.w. | No. 1. |
| | | 20 B | O./w. | | | 77 (12.0) | | |
| | | 20 X | O./w. | | | 89 (16.0) | D.w.-d. | No. 1. |
| Alum | 9 | Bl | W./o. | 57 | 0/0 | 0.8 E | | |
| | | 10 B | W./o. | 95 | 3/3 | 9.2 (5.6) | | |
| | | 20 B | W./o. | 125 | 8/8 | 12 (6.0) | | |
| | | 30 B | O./w. | | | 26 (4.0) | | |
| | | 10 X | W./o. | 60 | 5/5 | 4.4 (3.0) | D.w.-d. | No. 1. |
| | | 20 X | W./o. | 96 | 2/2 | 10.8 (5.2) | | |
| | | 30 X | O./w. | | | 27 (3.5) | | |
| Alum | 4.5 | Bl | W./o. | 50 | 0/0 | 1.0 E | D.-d.w. | No. 1. |
| | | 10 B | W./o. | 105 | 0/0 | 6.6 (4.6) | | |
| | | 20 B | W./o. | 132 | 2/2 | 9.4 (6.0) | | |
| | | 30 B | W./o. | 145 | 5/5 | 11 (6.0) | | |
| | | 40 B | O./w. | | | 24 (4.0) | | |
| | | 20 X | W./o. | 110 | 0/0 | 5 (3.6) | D.-d.w. | No. 1. |
| | | 30 X | W./o. | 110 | 0/0 | 8 (5.1) | | |
| | | 40 X | W./o. | 112 | 0/0 | 8.8 (5.2) | | |
| | | 50 X | O./w. | | | 29 (4.5) | | |
| CaCl₂ | 10 | Bl | W./o. | 54 | 0/0 | 0.0 | D.-d.w. | No. 1. |
| | | 10 B | W./o. | 68 | 0/0 | 0.6 E | | |
| | | 20 B | O./w. | | | 48 (7.0) | | |
| | | 10 X | W./o. | 58 | 0/0 | 0.7 E | D.-d.w. | No. 1. |
| | | 20 X | O./w. | | | 63 (7.0) | | |
| CaCl₂ | 3.5 | Bl | W./o. | 67 | 0/0 | 0.5 E | D.w.-d. | No. 1. |
| | | 10 B | W./o. | 80 | 0/0 | 2 (1.4) | | |
| | | 20 B | W./o. | 60 | 0/0 | 12.6 (6.4) | | |
| | | 30 B | O./w. | | | 37.5 (5.0) | | |
| AlCl₃ | 3.5 | Bl | W./o. | 45 | 0/0 | 1.0 E | D.-d.w. | No. 1. |
| | | 10 B | W./o. | 78 | 0/0 | 6 (4.0) | | |
| | | 20 B | W./o. | 95 | 0/0 | 11 (5.0) | | |
| | | 30 B | O./w. | | | 38.5 (5.5) | | |
| | | 20 X | W./o. | 95 | 0/0 | 9.6 (6.2) | D.-d.w. | No. 1. |
| | | 30 X | W./o. | 87 | 0/0 | 15 (8.0) | | |
| | | 40 X | O./w. | | | 40 (7.5) | | |
| Ca(OH)₂ | 3.5 | Bl | W./o. | 65 | 0/0 | 0.6 E | D.w.-d. | No. 1. |
| | | 10 B | W./o. | 81 | 0/0 | 0.4 oil | | |
| | | 20 B | O./w. | | | 35 (5.0) | | |
| CaCl₂ | 15 | Bl | W./o. | 54 | 0/0 | 0.0 | D.-d.w. | No. 1. |
| | | 10 B | W./o. | 65 | 0/0 | 0.1 E | | |
| | | 20 B | W./o. | 73 | 0/0 | 18 (8.4) | | |
| | | 30 B | O./w. | | | 48.5 (6.5) | | |
| | | 10 X | W./o. | 59 | 0/0 | 0.1 E | D.-d.w. | No. 1. |
| | | 20 X | W./o. | 68 | 0/0 | 2.4 (1.8) | | |
| | | 30 X | O./w. | | | 57.5 (9.5) | | |
| BaCl₂ | 6.6 | Bl | W./o. | 54 | 0/0 | 0.0 | D.w.-d. | No. 1. |
| | | 10 B | W./o. | 63 | 2/2 | 1.0 oil | | |
| | | 20 B | W./o. | 81 | 3/3 | 10 (7.8) | | |
| | | 30 B | O./w. | | | 57 (7.2) | | |
| | | 20 X | W./o. | 65 | 0/0 | 1.3 oil | D.w.-d. | No. 1. |
| | | 30 X | W./o. | 92 | 4/4 | 10.4 (5.6) | | |
| | | 40 X | O./w. | | | 52 (7.0) | | |
| BaCl₂ | 9.6 | Bl | W./o. | 50 | 0/0 | 0.2 E | D.-d.w. | No. 1. |
| | | 10 B | W./o. | 63 | 0/0 | 0.2 E | | |
| | | 20 B | W./o. | 64 | 0/0 | 0.8 oil | | |
| | | 30 B | O./w. | | | 62 (10.0) | | |
| | | 10 X | W./o. | 54 | 0/0 | 0.2 E | D.-d.w. | No. 1. |
| | | 20 X | W./o. | 68 | 0/0 | 2.4 (1.4) | | |
| | | 30 X | O./w. | | | 72.6 (9.0) | | |
| BaCl₂ | 9.6 | Bl | W./o. | 57 | 0/0 | 0.0 | D.-s.w. | No. 1. |
| | | 10 B | W./o. | 64 | 0/0 | 0.4 E | | |
| | | 20 B | W./o. | 91 | 5/5 | 1.8 oil | | |
| | | 30 B | W./o. | 105 | 6/6 | 15 (9.0) | | |
| | | 40 B | O./w. | | | 58 (4.0) | | |
| | | 20 X | W./o. | 72 | 0/0 | 0.3 E | D.-s.w. | No. 1. |
| | | 30 X | W./o. | 105 | 4/4 | 1.8 E | | |
| | | 40 X | W./o. | | | 3.0 oil | | |
| | | 50 X | O./w. | | | 66 (12.0) | | |
| Al₂(SO₄)₃ | 4.5 | Bl | W./o. | 55 | 0/0 | 0.0 | D.-s.w. | No. 1. |
| | | 20 B | W./o. | 83 | 0/0 | 2 (1.1) | | |
| | | 30 B | W./o. | | | 50 (5.0) | | |
| | | 40 B | O./w. | | | | | |
| | | 20 X | W./o. | 73 | 0/0 | 0.0 | D.-s.w. | No. 1. |
| | | 30 X | W./o. | 73 | 0/0 | 29.4 (16.4) | | |
| | | 40 X | O./w. | | | 54 (4.0) | | |
| AlCl₃ | 3.5 | Bl | W./o. | 55 | 0/0 | 0.6 E | D.-s.w. | No. 1. |
| | | 30 B | O./w. | | | 59.5 (10.5) | D.-s.w. | No. 1. |
| | | 30 X | O./w. | | | 62 (10.0) | D.-s.w. | No. 1. |
| ZnCl₂ | 15 | Bl | W./o. | 55 | 0/0 | 0.0 | D.-d.w. | No. 1. |
| | | 10 B | W./o. | 53 | 0/0 | 0.0 | | |
| | | 20 B | W./o. | 104 | 0/0 | 5.6 (3.0) | | |
| | | 30 B | W./o. | 117 | 0/0 | 9.4 (4.4) | | |
| | | 40 B | O./w. | | | 23 (3.0) | D.-d.w. | No. 1. |
| | | 10 X | W./o. | 52 | 0/0 | 0.5 | | |
| | | 20 X | W./o. | 68 | 0/0 | 1.0 | | |
| | | 30 X | W./o. | 85 | 0/0 | 6.4 (2.4) | | |
| | | 40 X | O./w. | | | 30 (4.0) | | |
| FeCl₃ | 3.5 | Bl | W./o. | 60 | 1/1 | 1.0 E | D.-s.w. | No. 1 |
| | | 40 B | W./o. | 75 | 4/4 | 7 (5/9) | | |
| | | 50 X | O./w. | | | 41 (3.0) | D.-s.w. | No. 1. |

TABLE III—Continued

| Salt | | Clay, lbs./bbl. | Emulsion | | | | | Method conc. |
|---|---|---|---|---|---|---|---|---|
| Type | Lbs./bbl. | | Type | Viscosity | Gels, initial, 10 min. | Fluid loss | Order mix | |
| SnCl₄ | 3.5 | Bl | W./o. | 68 | 0/0 | 0.0 | D.-d.w. | No. 1. |
| | | 30 B | W./o. | 122 | 1/1 | 1.6 (1.0) | | |
| | | 40 B | W./o. | 150 | 2/2 | 2.2 (1.4) | | |
| | | 50 B | W./o. | 170 | 3/3 | 1.8 (1.2) | | |
| | | 60 B | W./o. | 175 | 5/5 | 1.8 (1.4) | | |
| | | 70 B | W./o. | 188 | 20/20 | 1.6 (1.2) | | |
| | | 50 X | W./o. | 93 | 2/2 | 0.2 oil | D.-d.w. | No. 1. |
| | | 60 X | W./o. | 162 | 5/5 | 0.3 oil | | |
| | | 70 X | W./o. | 160 | 10/10 | 0.4 oil | | |
| | | 80 X | W./o. | 150 | 17/17 | 0.8 oil | | |
| SnCl₄ | 3.5 | Bl | W./o. | 55 | 0/0 | 0.2 E | D.w.-d. | No. 1. |
| | | 30 B | W./o. | 135 | 0/0 | 0.8 oil | | |
| | | 40 B | W./o. | 155 | 10/10 | 2 (1.6) | | |
| | | 50 B | O./w. | | | 18 (3.0) | | |
| SnCl₄ | 3.5 | Bl | W./o. | 80 | 0/0 | 0.0 | S.w.-d. | No. 1. |
| | | 50 B | W./o. | 185 | 0/0 | 0.1 E | | |
| | | 60 B | W./o. | 205 | 5/5 | 0.4 oil | | |
| | | 70 B | W./o. | | | 0.6 oil | | |
| | | 80 B | O./w. | | | | | |
| | | 70 X | W./o. | 135 | 5/5 | 0.1 oil | S.w.-d. | No. 1. |
| | | 80 X | O./w. | | | 33 (3.0) | | |
| SnCl₄ | 3.5 | Bl | W./o. | 67 | 0/0 | 0.6 E | D.-s.w. | No. 2. |
| | | 60 B | W./o. | 190 | 2/2 | 0.6 E | | |
| | | 70 B | W./o. | | | 0.7 oil | | |
| | | 80 B | W./o. | | | 0.6 oil | | |
| | | 70 X | W./o. | 110 | 2/2 | 0.6 oil | D.-s.w. | No. 2. |
| | | 80 X | W./o. | | | 0.4 E | | |
| | | 90 X | W./o. | | | 0.4 oil | | |
| ZrCl₄ | 3.5 | Bl | W./o. | 61 | 0/0 | 0.0 | D.-d.w. | No. 2. |
| | | 20 B | W./o. | 114 | 1/1 | 0.7 E | | |
| | | 30 B | W./o. | 115 | 3/3 | 1.8 E | | |
| | | 40 B | W./o. | 130 | 6/6 | 1.8 E | | |
| | | 50 B | O./w. | | | 26 (3.0) | | |
| | | 30 X | W./o. | 128 | 5/5 | 0.6 E | D.-d.w. | No. 2. |
| | | 40 X | W./o. | 137 | 9/9 | 1.4 (0.4) | | |
| | | 50 X | W./o. | 126 | 5/5 | 1.0 E | | |
| AlCl₃ in situ | 3.5 | Bl | W./o. | 67 | 0/0 | 0.3 oil | D.-d.w. | No. 1. |
| | | 30 B | W./o. | 165 | 5/5 | 0.8 oil | | |
| | | 40 B | W./o. | | | 2.0 oil | | |
| | | 50 B | O./w. | | | 28.5 (3.5) | | |
| | | 50 X | W./o. | | | 1.8 oil | D.-d.w. | No. 1. |
| | | 60 X | O./w. | | | 34 (4.0) | | |
| AlCl₃ in situ | 3.5 | Bl | W./o. | 72 | 0/0 | 0.4 E | D.-s.w. | No. 1. |
| | | 60 B | W./o. | 153 | 0/0 | 1.0 E | | |
| | | 70 B | W./o. | | | 0.8 E | | |
| | | 80 B | W./o. | | | 1.2 oil | | |
| | | 60 X | W./o. | 240 | 25/40 | 1.4 E | | |
| | | 80 X | W./o. | | | 1.6 oil | | |
| | | 90 X | O./w. | | | | | |

Nomenclature and pertinent information for Table III:

(1) In each system, the following formula was first compounded—

|   | Lbs./bbl. |
|---|---|
| Clay (XACT-811) | 16 |
| Sodium chloride | 7 |
| Sterox CD | 1.5 |
| Commercial lecithin | 4 |

Salt (as per the first and second columns of Table III).

The column headed "Method Conc." indicates the mode of compounding the dry concentrate:

Method No. 1.—The Sterox CD and lecithin were mixed and heated and then added as a mixture to the clay (XACT-811). After the clay and these surface active agents had been intimately admixed, the sodium chloride and the particular salt were added.

Method No. 2.—Same as Method No. 1 above except that the lecithin was added first to the clay and then the Sterox CD separately added, followed by the sodium chloride and salt per above table.

(2) In the "Clay" column, Bl. means blank, i.e., an emulsion containing only water, oil and the concentrate, "B" means bentonite and "X" means XACT clay as above defined.

(3) Under the columns headed "Emulsion," it is indicated whether the emulsion was water-in-oil (w./o.) or oil-in-water (o./w.). The viscosity is given in Fann centipoises, the gel strengths in grams and the fluid loss in cc. per standard 30 min. test procedure. In the "Fluid Loss" column, the letter E indicates the fluid lost was emulsion and the figures in the parentheses are the volumes of free oil appearing in the fluid lost unless otherwise indicated, the figure just preceding the parenthetical figure being the total fluid lost. In the "Order Mix" column, d. means diesel oil, d.w. means distilled water and s.w. means water saturated with salt (sodium chloride).

(4) General procedure.—The concentrate, prepared as indicated, was added to and mixed with the first component noted in the "Order Mix" column and then the second component noted in such column brought in to form the final emulsion. For example, for the concentrate containing 15 lbs./bbl. of PbCl₂, the concentrate was added first to diesel oil, the two stirred together thoroughly and then the distilled water was added. In each instance shown in the table, there was used 40 volume percent of oil and 60 volume percent of water. After the emulsion mud had thus been prepared, it was divided into a number of portions and the properties of one portion determined as the blank in the above table. To the other portions were added the indicated amounts of clay (bentonite and XACT, respectively) followed by 5 minutes stirring on a Hamilton Beach mixer and then 5 minutes on a Waring Blendor. The portions were then permitted to stand overnight followed by again stirring for 5 minutes on a Hamilton Beach mixer. The properties of the portions were then determined.

(5) In each case after a w./o. emulsion had inverted to an o./w. emulsion, it became so thick and fluffy that viscosity and gel strength measurements could not be taken accurately. Accordingly, none are reported above.

From the above table, it will be seen that, weight for weight, the water-soluble salts of iron, tin and zirconium as well as those of aluminum formed in situ are superior to such salts as calcium chloride, barium chloride and even aluminum sulfate or aluminum chloride added as such. It will also be noted that aluminum chloride formed in situ in the emulsion mud produces one having characteristics superior, both from a clay solids and a fluid loss standpoint, to emulsions respectively containing equivalent or greater amounts of aluminum sulfate or barium chloride. This synergistic effect is not explainable at this time but it does exist.

As mentioned above, the formation of salts of iron, tin and zirconium, as well as salts of aluminum other than the chloride, by the reaction of two ingredients in situ in the emulsion can be practiced to achieve similar superior results provided these ingredients are capable of reacting to form the desired water-soluble heavy metal salt and an insoluble precipitant comprising a combination of the remaining ions of the two reactants. This reaction can be generally expressed as follows:

$$MX + YZ \rightarrow MZ + YX$$

wherein M is the desired metal selected from the group consisting of iron, tin, zirconium and aluminum; X is the anion originally combined with the metal M such as a sulfate; and Y is a cation originally combined with the anion Z which is to remain in solution as a part of the compound MZ. YX is preferably insoluble in fresh water or saturated salt water while MZ is both soluble and ionizable in such a medium.

Before proceeding further, it might best be explained now that the seven (7) lbs./bbl. of sodium chloride set forth in Formulae No. 1 and No. 2 is approximately the amount required to yield 30,000 parts per million of this salt in the aqueous phase of an emulsion comprising 40 volume percent of oil and 60 volume percent of water. At such concentration of sodium chloride, the hydration of clays encountering the water phase is reduced to a minimum and it is preferred that sufficient sodium chloride be employed to yield such a concentration in the aqueous phase irrespective of the volume percent of the aqueous phase employed. Of course, the sodium chloride can be omitted from the emulsion entirely if desired but generally such omission will result in an emulsion mud of lesser stability. This will be less true when saturated salt water is employed as the aqueous phase.

The amount of the heavy metal salt employed should be sufficient to impart increased stability to the emulsion mud, i.e. increase its resistivity to inversion to an oil-in-water emulsion by added solids or clays while maintaining the fluid loss as low as possible. Thus, at least 1 and preferably at least 3 pounds of the heavy metal salt per barrel of emulsion is to be employed. Generally, increasing the amount of the selected heavy metal salt employed will increase the stability of the mud and usually the upper limit of heavy metal salt concentration will be dictated by economics. It has been found that a heavy metal salt concentration within the range of 1 to 15, preferably 3 to 10, pounds per barrel of emulsion will be satisfactory. In the dry concentrate of this invention, a concentration within the same range can be employed, i.e. upon addition of a predetermined weight of the concentrate to the emulsion, the resulting concentration of heavy metal salt in the emulsion will be as above indicated. In the case of the reactive ingredients, such as aluminum sulfate and barium chloride, added to form the desired heavy metal salt in situ in the mud, sufficient of each ingredient to be reacted is employed to yield, upon reaction, the desired amount of heavy metal salt, e.g. stoichiometric equivalents of the ingredients to yield the final desired heavy metal salt.

Order of addition

A preferred mode of adding the dry concentrate to the oil and water ingredients has been indicated above. The following data illustrates this point further:

TABLE IV

| Salt | | D.w.-d. | | S.w.-d. | | D-d.w. | | D.-s.w. | | C.-d.w. | | C.-s.w. | | D.w.-c. | | S.w.-c. | |
|---|---|---|---|---|---|---|---|---|---|---|---|---|---|---|---|---|---|
| Type | Lbs./bbl. | Type [2] | F.L.[3] | Type | F.L. | Type | F.L. | Type | F.L. | Type | F.L. | Type | F.L. | Type | F.L. | Type | F.L. |
| SnCl₄ | 3.5 | W./o | 0.2 | W./o | 0.0 | W./o | 0.0 | W./o | 0.6 | | | | | | | | |
| AlCl₃ | 3.5 | O./w | 57 | W./o | 0.6 | W./o | 1.0 | | | | | | | | | | |
| CrCl₃ | 3.5 | O./w | 70 | | | W./o | 0.2 | W./o | 0.9 | | | | | | | | |
| FeCl₃ | 3.5 | O./w | 71 | | | O./w | 73.5 | W./o | 1.0 | | | | | | | | |
| CaCl₂ | 3.5 | W./o | 1.4 | | | W./o | 0.5 | | | | | | | | | | |
| CaCl₂ | 15 | | | | | W./o | 0.4 | W./o | 0.3 | W./o | 0.1 | W./o | 0.7 | W./o | 0.6 | W./o | 0.2 |
| AlCl₃ in situ | 3.5 | O./w | 65 | W./o | 0.0 | W./o | 0.4 | W./o | 0.7 | W./o | 0.0 | W./o | 0.1 | W./o | 0.0 | W./o | 0.0 |
| AlF₃ | 3.5 | | | | | W./o | 0.4 | | | | | | | | | | |
| ZrCl₄ [1] | 3.5 | | | | | W./o | 0.0 | | | | | | | | | | |
| SnCl₄ | 0.75 | | | | | W./o | 0.0 | | | | | | | | | | |
| SnCl₄ | 2.2 | | | | | W./o | 0.0 | | | | | | | | | | |
| SnCl₄ | 4.5 | | | | | W./o | 0.4 | | | | | | | | | | |

[1] Mud prepared out of contact with iron.
[2] Type designates whether resulting emulsion was water-in-oil (w./o. or oil-in-water (o./w.).
[3] F.L. means fluid loss (cc. in 30 min.).

In the above table, a dry concentrate was prepared in accordance with Formula No. 2 above except that the heavy metal salts were interchanged as indicated in Table IV. In the columns succeeding the ones headed by Salt, d.w. means distilled water, s.w. means salt water, d. means diesel oil and c. means crude oil (a 30° API composite from the Slaughter field). The order of addition of the concentrate and the water and oil is indicated by the order in which the oil and water are named at the head of each of the pairs of columns. For example, in the first pair of columns, the concentrate was added first to distilled water and then diesel oil was brought in. The amount of oil used in each instance was 40 volume percent and the water was 60 volume percent. The amount of concentrate added was sufficient to give the indicated concentration of its ingredients in the emulsion.

Water phase

A feasible range for the water phase concentration can be from about 40 to about 75 volume percent of the emulsion. However, it has been found that by using ingredients of Formula No. 2 above, the range of operable water content is much broader in that an operable emulsion mud will result with a water phase concentration within the broad range of 20 to 80 volume percent of the emulsion. When heavy metal salts other than the aluminum sulfate-barium chloride combination are employed, the water phase concentration range can be similarly broad (20–80 volume percent). However, as a matter of practicability, the original emulsion mud should be made up of an emulsion containing a water phase concentration in the intermediate portion of the above broad range so as to permit dilution with additional water or oil without unduly harming the mud.

The effect of varying water phase concentration is illustrated in the following table:

TABLE V

| Emulsion | | Fann visc. cp. | Gels, gms. initial/ 10 min. | Fluid loss cc. | Emulsion appearance after standing overnight |
|---|---|---|---|---|---|
| Vol. percent oil | Vol. percent water | | | | |
| 5 | 95 | 4 | 0/0 | 38 | No emulsion-water layer. |
| 10 | 90 | 7 | 0/0 | 56 | Do. |
| 20 | 80 | 200 | 0/0 | 0.0 | Good. |
| 30 | 70 | 127 | 0/0 | 0.0 | Do. |
| 40 | 60 | 60 | 0/0 | 0.0 | Good with 1/8" oil layer. |
| 50 | 50 | 31 | 0/0 | 0.0 | Good with 3/16" oil layer. |
| 60 | 40 | 19 | 0/0 | [1] 0.5 | Good with 5/16" oil layer. |
| 70 | 30 | 12 | 0/0 | [1] 0.6 | Good with 1" oil layer. |
| 80 | 20 | 9 | 0/0 | [1] 0.4 | Good with 1 1/8" oil layer. |
| 90 | 10 | 5 | 0/0 | [1] 1.2 | Good with 1 1/4" oil layer. |

[1] Oil.

The emulsion muds for the above table were made up from a single lot of dry concentrate of the following formula:

| | Lbs./bbl. |
|---|---|
| Dowcide No. 6 | 0.35 |
| Clay (XACT-811) | 16.0 |
| Commercial lecithin | 4.0 |
| Sterox CD | 1.5 |
| Sodium chloride | 7.0 |
| $Al_2(SO_4)_3 \cdot 14H_2O$ | 7.8 |
| $BaCl_2 \cdot 2H_2O$ | 9.6 |
| Total | 46.2 |

This formula was compounded by adding the Dowcide 6 to the lecithin, heating the mixture to about 150° F., adding it to the clay, heating the Sterox CD to about 150° F. and adding it to the clay-lecithin-Dowcide mixture. The remaining ingredients were then added. A predetermined quantity of the formula sufficient to yield the above concentrations of ingredients in the emulsion (i.e. 46.2 lbs. of concentrate per barrel of emulsion) was then added to the indicated quantity of oil (diesel) and then the resulting mixture emulsified with water (saturated salt water).

It will be noted that saturated salt water as the water phase ordinarily yields a more stable emulsion than does fresh or distilled water.

*Oil phase*

The concentrates and the heavy metal salts of this invention are operable with either refined or crude oils. However, the data indicates that, in order to obtain a desirable water-in-oil emulsion mud, the order of mixing of Formula No. 2 above with refined oil (diesel oil) and water is more critical than with crude oil and water. Thus, with every crude oil tried, a water-in-oil emulsion was obtained irrespective of whether the concentrate was added first to the oil or to the water. In the case of refined oil (diesel), the order of addition becomes important with respect to some heavy metal salts and not to others. This is reflected in Table IV above.

The amount of oil to be used will be equal, in volume percent, to one hundred minus the volume percent of water to be employed; that is, 80 to 20 volume percent for the broad water range indicated above and 60 to 25 volume percent for the narrower water range.

*Preservative*

As indicated above, a preselected preservative preferably should be added to Formula No. 2 or to other formulas or emulsions containing a heavy metal salt and lecithin so as to prolong the effectiveness of the lecithin.

To demonstrate this, there was made up several portions of a dry concentrate having ingredients as set forth in Formula No. 2 above. These portions were divided into pairs. The first pair did not include a preservative while the second and third pairs respectively incorporated 0.35 part of Dowcide No. 1 and Dowcide No. 6. The portions of each pair were respectively aged in a dry state at room temperature and at 110° F. and were tested periodically by making up a part thereof into an emulsion to determine if they had lost their effectiveness to form a satisfactory water-in-oil emulsion, it being considered that they had lost such effectiveness when the resulting emulsion exhibited a fluid loss greater than 2 cc. (30 min.). In the instance of the portions not containing a preservative, both remained stable for more than one month but both lost their effectiveness before the end of the second month. In the case of the portions containing Dowcide No. 1, each was still effective after more than two months of aging and at that time showed no indication of decreased effectiveness, whereas the portions containing Dowcide No. 6 each remained effective after more than three months had passed and showed no signs of deterioration. Thus, these two preservatives each substantially increase the shelf life of Formula No. 2 whether stored under conditions of normal room temperature or at 110° F.

All reference to test procedure, such as fluid loss determination, and to test results, such as viscosity and fluid loss, are made with respect to API Recommended Practice 29, third edition, May 1950.

The teachings of the foregoing specification may find advantageous application to oil base muds. Thus, the dry free-flowing concentrate, modified if desired, can be used in preparing oil base muds particularly where it is desirable to subsequently convert such oil base muds to stable emulsion muds, either by the addition of fresh or salt water from an external source or by permitting the mud to become contaminated with water derived from earthen formations. Further, the heavy metal salts of this invention can likewise be employed in conjunction with oil base muds, particularly under circumstances where the muds are to be converted to emulsion muds as outlined above.

From the foregoing it will be seen that this invention is one well adapted to attain all of the ends and objects hereinabove set forth, together with other advantages which are obvious and which are inherent to the method and composition.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth is to be interpreted as illustrative and not in a limiting sense.

The invention having been described, what is claimed is:

A dry, free-flowing concentrate for adding to water and oil to prepare a water-in-oil emulsion fluid for use in wells, which comprises an intimate admixture of finely ground adsorptive mineral selected from the group consisting of Angelina County filter clay, kaolin, diatomaceous earth and calcined attapulgite, a normally liquid oil-soluble non-ionic surface-active agent and a normally liquid water-soluble non-ionic surface-active agent, said mineral and said agents being present in said admixture in an amount of, for each barrel of said fluid to be prepared, at least 10 pounds of said mineral, at least 2.5 pounds of said oil-soluble agent and at least 0.1 pound of said water-soluble agent, said mineral having characteristics such that with the amount employed, said agents are adsorbed thereon and the admixture is rendered dry and free-flowing and, upon addition of said admixture to said water and oil, a water-in-oil emulsion is formed, said admixture also including aluminum sulfate and barium chloride.

References Cited in the file of this patent

UNITED STATES PATENTS

| | | |
|---|---|---|
| 1,784,360 | Koegebehn | Dec. 9, 1930 |
| 1,993,771 | Calcott et al. | Mar. 12, 1935 |
| 2,350,154 | Dawson et al. | May 30, 1944 |
| 2,582,323 | Fischer | Jan. 15, 1952 |
| 2,661,334 | Lummus | Dec. 1, 1953 |
| 2,689,219 | Menaul | Sept. 14, 1954 |
| 2,754,265 | Hoeppel | July 10, 1956 |